United States Patent
Elvanoglu et al.

(10) Patent No.: US 6,799,320 B1
(45) Date of Patent: Sep. 28, 2004

(54) PROVIDING BINDING OPTIONS FOR COMPONENT INTERFACES

(75) Inventors: Ferhan Elvanoglu, Redmond, WA (US); Benjamin L. Chronister, Everett, WA (US); Terry L. Lucas, Mill Creek, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/212,717

(22) Filed: Dec. 16, 1998

(51) Int. Cl.⁷ .................................................. G06F 9/00
(52) U.S. Cl. ........................ 719/331; 717/145; 717/146; 717/147; 717/148; 717/153; 717/162
(58) Field of Search ................................. 709/310–332; 719/331; 717/145–148, 153, 162

(56) References Cited

U.S. PATENT DOCUMENTS

| | | | | |
|---|---|---|---|---|
| 5,481,721 A | * | 1/1996 | Serlet et al. ................ | 709/315 |
| 5,511,197 A | * | 4/1996 | Hill et al. .................... | 709/328 |
| 5,515,536 A | * | 5/1996 | Corbett et al. .............. | 709/315 |
| 5,727,145 A | * | 3/1998 | Nessett et al. .............. | 713/200 |
| 5,793,965 A | * | 8/1998 | Vanderbilt et al. .......... | 709/203 |
| 5,842,220 A | * | 11/1998 | De Groot et al. ........... | 707/103 |
| 6,044,205 A | * | 3/2000 | Reed et al. .................. | 709/201 |
| 6,085,030 A | * | 7/2000 | Whitehead et al. ........... | 707/10 |
| 6,161,148 A | * | 12/2000 | Pratt et al. .................. | 709/315 |
| 6,347,342 B1 | * | 2/2002 | Marcos et al. .............. | 709/315 |

OTHER PUBLICATIONS

Chappell, David Understanding ActiveX and OLE, Jul. 1996, Micrsoft Press, pp. 20, 48–49, 70–75, 92–102.*

* cited by examiner

Primary Examiner—Meng-Al T. An
Assistant Examiner—Charles Anya
(74) Attorney, Agent, or Firm—Christensen O'Connor Johnson Kindness PLLC

(57) ABSTRACT

A proxy component system having dispatch proxies and object proxies is disclosed. The computerized system includes an operating system supporting component interfaces. In addition, the system includes a first interface to a target component, with the first interface having an early bound method. The system further includes a second interface to a proxy component, with the second interface having a late bound method. Also included in the system is a dispatch proxy operative to invoke the early bound method of the first interface from an invocation of the late bound method of the second interface.

23 Claims, 5 Drawing Sheets

PROVIDING BINDING OPTIONS FOR COMPONENT INTERFACES

FIELD OF THE INVENTION

This invention relates generally to software component interfaces, and more specifically to providing binding options for software component interfaces.

BACKGROUND OF THE INVENTION

Software components are a technique used to improve software development productivity and program flexibility. Reusable software components are designed to apply the power and benefit of reusable, interchangeable parts from other industries to the field of software development. Software components have standard interfaces making them interchangeable and reusable. Examples of software components tend to be oriented toward user interface elements. They can be simple like familiar push buttons, text fields list boxes, scrollbars and dialogs, or they can be more complex, such as calculators and spreadsheets.

Microsoft's COM (Component Object Model) is an example of a software component development model. COM is a component environment commonly used by applications written in Microsoft's Visual Basic and Visual C++ programming languages. COM can generally be defined as a specification for a software development methodology and an Application Program Interface (API) that allows software components to communicate and interact with each other, and to be dynamically interchanged. A detailed description of COM methods and other aspects of COM are described in Dale Rogerson, "Inside COM," 1997 (ISBN 1-57321-349-8) which is hereby incorporated by reference.

COM requires that software components, which are also referred to as COM objects, use certain standards and rules when defining the APIs that they expose to other components that they communicate with. The APIs they expose define the communication contract between components. An API that is exposed by a COM object is referred to as a COM interface. A programmer can use a published definition of a COM object and an interface it exposes to write programs that will use these objects by calling functions that are defined by the interface definition. The interfaces that are exposed by an object can be one of three different types: custom interfaces, dispatch interfaces and dual interfaces.

A custom interface requires the programmer calling the interface's methods to have the description of the interface at the time of the implementation. The calls made to the interface methods on custom interfaces are referred to as early bound calls. This is because the choice of which method to call occurs at the time the method is invoked. Interfaces of this type are derived from the common IUnknown interface definition.

A dispatch interface (dispinterface) hides the details of an interface implementation from the application programmer who is using it. Every method in a dispatch interface has an identification number that is referred to as a DISPID (dispatch identifier). The programmer prepares the code to call certain methods that are common for all dispatch interfaces, and passes the DISPID of the method to execute it. The programmer can also call other methods to convert method names that might be available in the program to DISPID values. The calls that are made to the methods on dispatch interfaces are referred to as late bound calls. This is because the choice of the particular method to call is made by the dispatch interface after the method has been invoked. A dispatch interface cannot be called using early bound calls. These interfaces are derived from the common IDispatch interface definition, which is derived from IUnknown interface definition.

A dual interface is an interface that is derived from a dispatch interface, but its methods can also be called using early bound calls.

COM components have the quality that when used within their intended environments, new or alternative components can be substituted for old components without requiring any changes to the application using the component. In addition, software components can be easily incorporated into new programs using software building tools, thereby freeing the developer from writing code to implement the functionality provided by the component.

The above described qualities provide significant advantages over other models for software development, however there are also several drawbacks.

First, a COM object exposes one or more interfaces with multiple methods on each. On larger components, the number of interfaces exposed and the number of methods on each interface may be overwhelming. This in turn results in a large number of test scenarios. The total number of test scenarios is directly related to the number of interfaces and methods, since each interface and method define different ways of using the component.

Second, as discussed above, an interface may be one of three types. The dual interfaces in particular require their methods to be tested both using the IDispatch interface approach and the custom interface approach. This causes the number of test scenarios to increase by at least a factor of two for dual interfaces.

Third, implementation of test cases requires different coding techniques for early bound and late bound interface calls. This can typically double the amount of test code to be written, with a corresponding increase in the time spent preparing and debugging the test cases.

For early bound cases in particular, there is also the overhead of rebuilding the code when the interface definition changes. Although typically an interface definition does not change once it is public, it can be modified during the implementation. With each change to the interface definition, all software modules that contain early bound calls to the interface must be rebuilt. This takes time, complicates the development process and requires the test group to have access to the detailed information about the interface definition at all times in order to be aware of any changes and rebuild the test code.

Finally, there is the problem of user education. COM can be a rather complicated area of software technology, and it takes a developer time to learn its details and intricacies. If the test scenarios are to be implemented using a conventional programming language, the developer has to be fluent using this programming language as well. This takes time and is an extra cost. In addition, there is a risk of having bugs in the test suite code, since it too is a complicated piece of code.

Therefore, there is a need for a component with a minimal number of easy to use interfaces that allow for the use of both early and late bound calls. In addition, the component needs to provide a choice of which type of call to be made at run-time. Finally, the applications using the component should not need to be recompiled and relinked and when an interface changes.

SUMMARY OF THE INVENTION

The above-mentioned shortcomings, disadvantages and problems are addressed by the present invention, which will be understood by reading and studying the following specification. The invention describes a component environment providing dispatch proxies and object proxies. In one embodiment of the invention, the computerized system includes an operating system supporting component interfaces. In addition, the system includes a first interface to a target component, with the first interface having an early bound method. The system further includes a second interface to a proxy component, with the second interface having a late bound method. Also included in the system is a dispatch proxy operative to invoke the early bound method of the first interface from an invocation of the late bound method of the second interface.

Thus, in one embodiment of the invention, a proxy component exposes a simple dual interface that contains methods and properties that can be accessed by its host application. An application can call these methods to create COM objects and ask for additional interface implementations from them. The methods are named after the actual COM library functions that are used in C/C++ programs, however those in the art will recognize that other alternative names are possible.

The proxy component provides its host with the ability to create other COM objects, query for interfaces that are implemented by those objects, make early or late bound calls to those interfaces, and store additional COM objects that may be created as a result of these calls. The host only has to be able to communicate to the interfaces that are exposed by the proxy component thereby providing a generic communications capability for any interface.

In an alternative embodiment of the invention, the proxy component exposes a property, referred to as "ForceProxy", through its main IDispatch interface. If this property is set to TRUE, then the following calls made to the COM objects that are created and communicated using the proxy component are made as early bound calls. If this property is set to FALSE, the calls are made as late bound calls. If an interface that is being communicated to is a custom interface then the ForceProxy property settings do not change anything and the calls are always made as early bound calls.

In addition, a computer system that hosts a proxy component can also host a script engine, allowing the complete COM functionality to be carried into a script language environment by using an embodiment of the invention. Since a script does not need building and is interpreted at run-time, proxy components provide on-the-fly access to COM objects and their interfaces to a script environment. This is the functionality that a programmer would have if the program were being written in a conventional programming language such as C++. However, unlike a C/C++ program a script program does not need to be compiled and linked to get an executable as a result.

The dispatch proxy and object proxy described in the present invention provide for advantages not found in previous systems. First, dispatch proxies have relatively few interface methods, thereby simplifying the programming knowledge required to use a proxy component. The low number of interface methods also reduces the amount of interface testing that is required.

Second, testing is simplified since the interface allows for choices to be made at run-time about which type of target component interface to call. This on-the-fly calling method defining ability reduces the possible number of test cases at least by a factor of two. Since the host can set or reset this flag before starting to run a test case, the complete test suite can be run using early or late bound calls, without actually changing the test suite. In addition, use of a proxy component reduces the room for error when creating test code, since the test code will look very similar regardless of the interface and object that is being tested. Also, since the test cases can be written using commonly known and easy to learn script languages, the learning and implementation times are much smaller than C/C++ coding cycles. For example, the JavaScript script language could be used to write COM based programs.

Third, the host application does not need to be rebuilt when changes in the target component interface occur. The proxy component of the present invention acts as a wrapper around the objects and interfaces that are created and communicated by the host. This results in simplified maintenance.

Fourth, dispatch proxies provide for generic communication to the host, when communicating to other COM objects. This way, the host application only needs to know the names of the methods and their parameters. There is no need to write separate code pieces for early and late bound calls. This simplifies and supports implementation.

Fifth, the proxy component of the present invention also wraps the objects that are returned from the calls that are made to other COM object's interface methods. Since the communication technique is the same for these objects as well, the proxy component provides simplified integration. This is especially true for the use of the proxy component with a script engine.

Finally, use of the proxy component of the present invention reduces the complexity of the COM software development task and decreases the time to be spent learning the details of the COM technology. Since the overhead is less, productivity increases. This is especially true when a computer system that hosts a script engine uses a proxy component.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, an embodiment is described where dispatch proxies are created and used. In the fourth section, an embodiment of the invention describing the creation and use of object proxies is presented. Finally, in the fifth section, a conclusion of the detailed description is provided.

Hardware and Operating Environment

Figure 1:
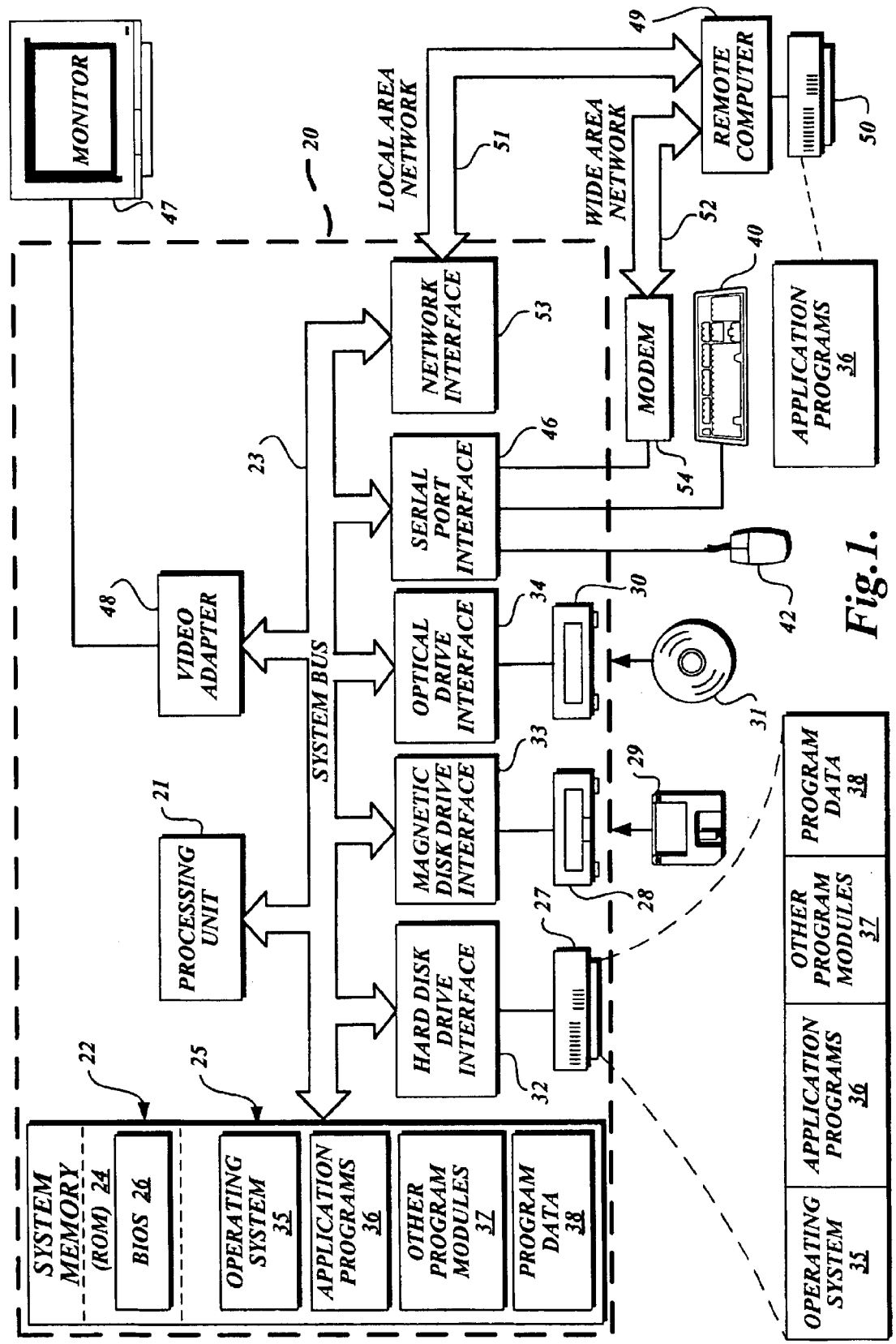
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
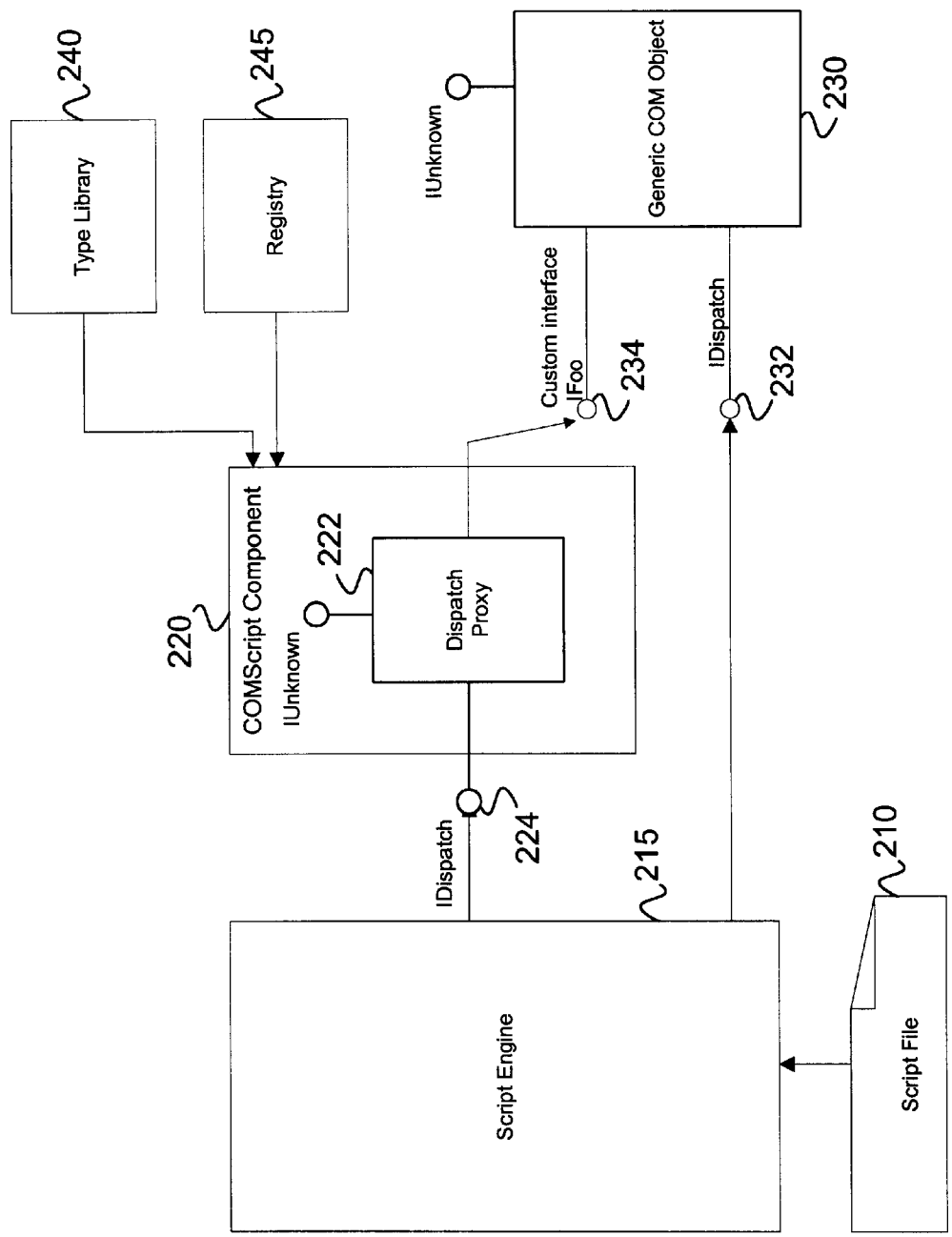
FIG. 2 is a diagram illustrating a system level overview according to one embodiment of the invention.

FIG. 2 presents a system level overview of an embodiment of the invention and typical related modules using the invention. Target COM object 230 is an object representing a COM component. Target COM object 230 comprises methods, properties and events defined using the COM standard. Target COM object 230 also comprises two interfaces, an IDispatch interface 232, and an IFoo interface 234. IDispatch interface 232 is a conventional COM dispatch interface, and is a late bound interface. IFoo interface 234 defines a custom interface to the component and is therefore an early bound interface. In alternative embodiments of the invention, target COM object 230 includes only a custom interface, an Idispatch interface is not present.

Script file 210 is a file comprising computer program source code written in a scripting language. The source code contains statements designed to make use of the component represented by target COM object 230. In one embodiment of the invention, script file 210 is a JavaScript file.

Script engine 215 is a computer program capable of interpreting the computer program source code contained in script file 210. Script engine 215 is capable of communicating with COM objects using the late bound interface defined by the IDispatch interface. Using a late bound interface is desirable because it eliminates the need to rebuild the script engine every time a new interface method is defined, as is the case with an early bound interface. Script engine 215 reads sequences of statements known as script blocks from script file 210. If a script block contains an invocation of a COM component, script engine 215 executes the method detailed below with reference to FIG. 3. In one embodiment of the invention, script engine 215 is a JavaScript engine. In an alternative embodiment of the invention, script engine 215 is replaced by an arbitrary application (not shown) desiring to make use of the simplified calling mechanisms provided by the invention. Those skilled in the art will recognize that other script engines and applications could be designed to make use of the systems and methods of the invention.

Proxy component 220 is a component designed using the COM standard. Proxy component 220 comprises a dispatch proxy object 222 containing COM compatible methods, properties and events. In addition, dispatch proxy 222 provides an IDispatch interface 224. Proxy component 220 also contains methods to read type library 240 and registry 245. The type library 240 contains a description of a COM component's properties, events and methods. The registry 245 contains identifiers for COM components, a file path to the executable for the components and a file path to the type libraries associated with the components.

If the host is hosting a script engine together with the proxy component, it is desirable to utilize all this functionality by introducing the proxy component to the script engine. By doing this script code can access all the methods that the proxy component exposes. This enables the scripts to be used for COM programming, with a choice of early or late bound calls. In addition, if script code is used for implementation of the test cases, the script engine handles queries for dispatch identifiers and making the method calls to the dispatch proxy. This enables the host application to be more generic and to require less maintenance.

Method For Creating And Using a Dispatch Proxy

The previous section presented a system level description of an embodiment of the invention. In this section, methods within an embodiment of the invention will be described with reference to flowcharts describing steps to be performed by computer programs implementing the method using computer-executable instructions. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer.

Figure 3A:
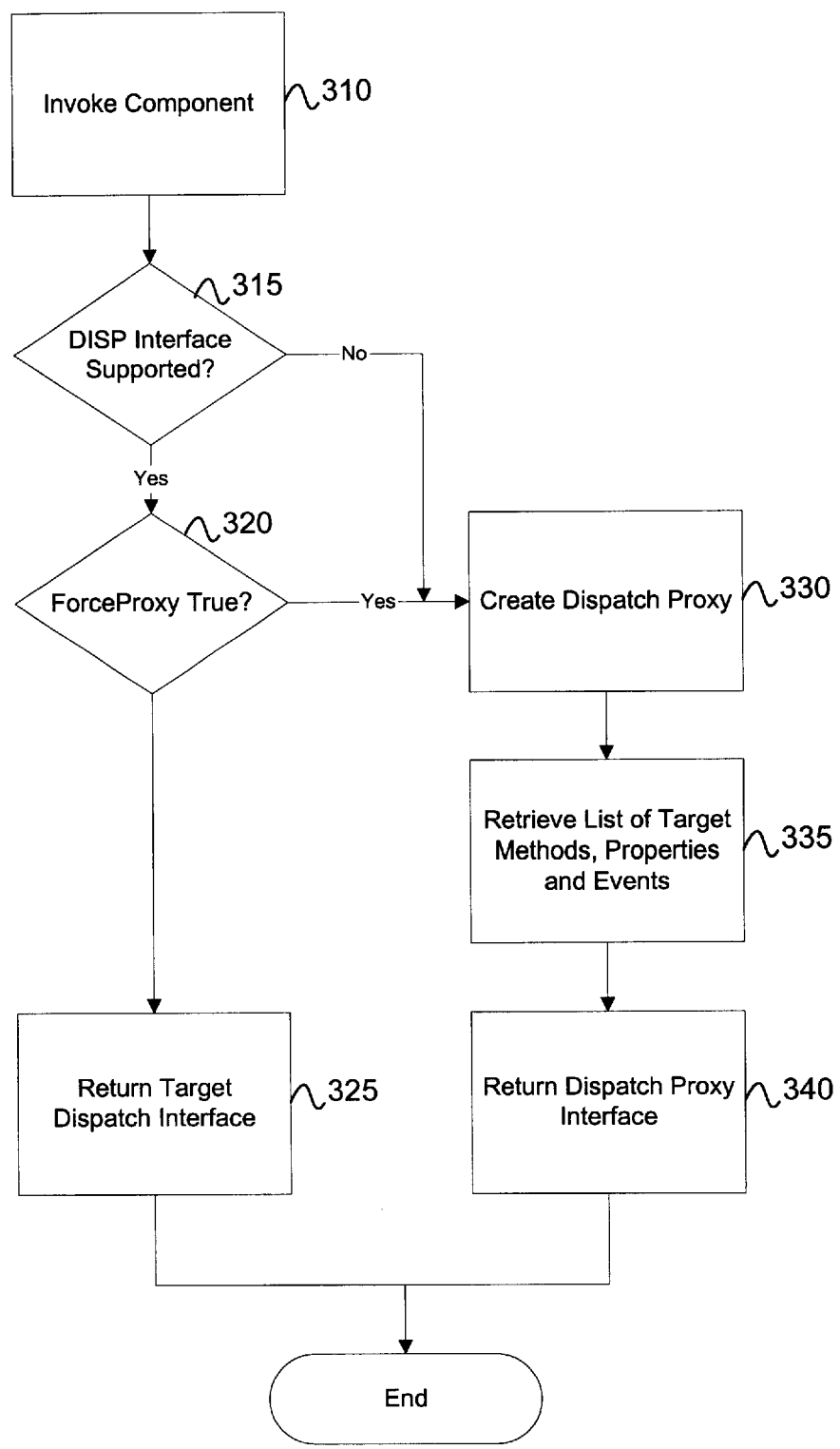
FIGS. 3(a) and 3(b) are flowcharts of methods describing a dispatch proxy in accordance with an embodiment of the invention.

Referring now to FIG. 3(a), a flowchart is presented for a computer implemented method to control whether late bound or early bound interface functions are used to interface with a component. The method is invoked at 310 when a script engine or host application executes code creating and invoking a component. An example of a call invoking the method is the CreateObject method. This method processes the parameters passed to it and makes a call to the CoCreateInstance( ) function of the standard COM function library. In one embodiment, the method receives two parameters as indicated by the sample function prototype below:

CreateObject (Object Information, Interface Information)

Desirably, the object information parameter is a character string having one of two different formats. In the first format, the character string contains the class identifier (id) string for the component that is to be created. In this case, the method converts the string to a class id structure and supplies the structure to the CoCreateInstance( ) call.

In the second format, the character string contains the program identifier for the component. Program identifiers are listed in the registry and can be used to retrieve information associated with the component. The class id information can be also be retrieved using the registry. This method is useful when the scripting engine alone cannot supply complete information about the component.

The interface information parameter is desirably a character string that can also have one of two different formats. In the first format, the character string contains the interface id string for the interface. In this case the method converts this string to an interface identifier structure and supplies it to the CoCreateInstance( ) call.

In the second format, the character string contains the name of the interface. If the component registered the interface names, then the registered name can be cross-referenced to an interface identifier. This method is useful if the name of the interface is in the registry. Using this method is slower, but generally makes the source code more readable when using the method with the script engine.

At 315, the method checks to see if the desired component specified at 310 supports a late bound interface. In one embodiment of the invention, the check is made for the presence of an IDispatch interface. If a late bound interface is not supported, the method proceeds to 330.

If a late bound interface is supported, at 320 the method checks a property controlling whether or not early bound interfaces should be used regardless of whether or not a late bound interface is defined. In one embodiment of the invention, this property is known as the ForceProxy property. If the ForceProxy property is true, the method proceeds to step 330.

At 325, the method returns a reference to the late bound interface of the target component. This reference can be used because the target component supports a late bound interface and the ForceProxy property indicates that use of an early bound interface is not required.

If the check made at 315 determines a late bound interface is not supported, or the check at 320 indicates that an early bound reference is to be used regardless of whether a late bound interface is available, then 330 creates a dispatch proxy. The dispatch proxy defines a late bound reference that can be used by scripting engines and other applications to invoke COM components in a generic way. In one embodiment of the invention, the late bound reference is through a COM object that exposes a dual interface, i.e. an interface that supports both late bound and early bound references from client applications. In an alternative embodiment, the late bound reference is through a COM object that exposes a "dispinterface" (dispatch interface) defined by the COM standard.

At 335, the method retrieves a list of the methods, properties and events supported by the target component. In one embodiment, the method first attempts to identify a dispatch interface for the target component. This query is performed regardless of the type of the interface specified at 310. The method then retrieves a pointer to a type information interface (ITypeInfo) using the identified dispatch interface. The method then uses the ITypeInfo pointer to create a list of methods and properties that are implemented by this interface. The list includes the name, inheritance level and virtual function pointer table (vtable) index for each method. In an alternative embodiment, the type library associated with the component is read to retrieve the information used to create the list.

A reference to the dispatch proxy is returned to the caller at 345. This reference can be used by the scripting engine or other client applications to invoke methods in the target component. All the calls to methods that are made by the scripting engine or other host applications are made as late bound calls, and the dispatch proxy translates them into early bound calls.

In addition to the CreateObject function described above, an embodiment of the invention also includes a function to retrieve information about the interface, including querying for other interfaces on an already existing object. According to the COM standard, once an application creates a COM object and retrieves a pointer to one of its interfaces, it can query the interface to get interface pointers to other interfaces that are implemented by the same COM object. All COM interfaces are derived from the IUnknown interface definition and they all implement the QueryInterface ( ) method of that interface.

In one embodiment of the invention, the proxy component provides the same functionality to its host by exposing the QI ( ) method from its main dispatch interface. The prototype for this method is:

QI (object information, interface information);

The object information parameter is a pointer to a dispatch-derived interface on an existing object. The host application may pass a pointer to a dispatch proxy that it has already received from the proxy component, or it may pass a dispatch-derived interface pointer to an object that it created by itself. The behavior changes by the value of the ForceProxy flag value, the same way it does for the CreateObject interface method.

The interface information parameter contains the information about the interface that is being queried. It can be the name of the interface if the interface is registered, or it can be the interface identification (IID) value string for the interface. If the name of interface is passed, then the proxy component converts the name to an IID by looking up the interface name in the registry.

The value returned from the method call depends on the value of the ForceProxy flag. If the flag is set to a true value, then the return value is a dispatch proxy object pointer. If the flag is set to false when the method was called and the interface that is being queried is a dispatch interface, a pointer to that interface is returned. In all other cases a dispatch proxy is created.

Figure 3B:
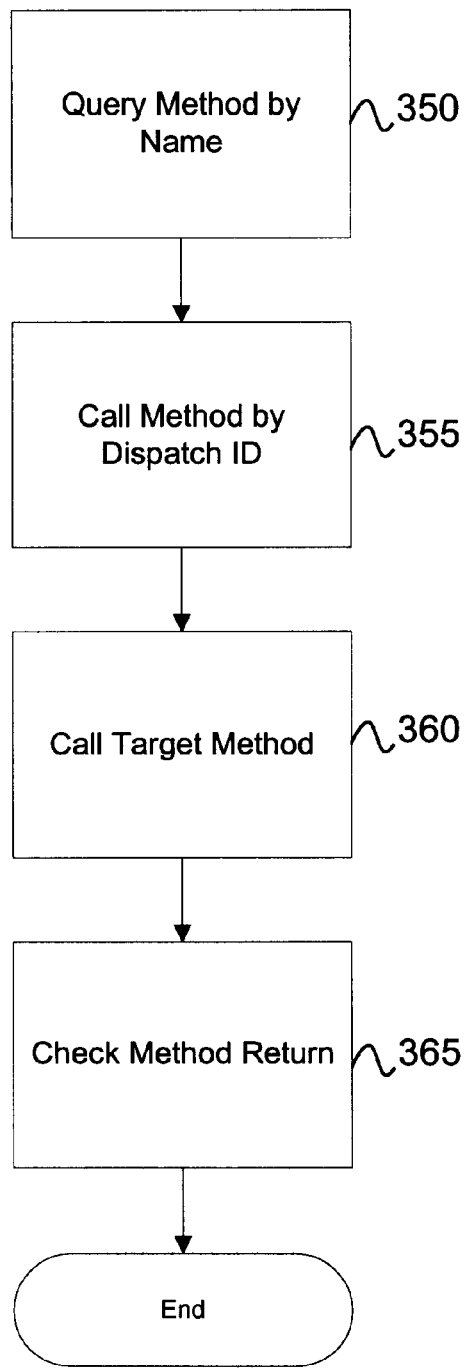

Referring now to FIG. 3(b), a method using the dispatch proxy described above is presented. The method is invoked at 350 when an application queries the dispatch proxy for the dispatch id of either a property or a method. The standard dispatch interface implementation requires an id number that is referred as the dispatch id (dispid) to be associated with each method and property that is implemented by a dispatch interface. To retrieve the dispid, the host passes the name of the desired method to the dispatch proxy. The dispatch proxy finds the name in the reference table and takes its index number, adds one to it and returns the result as the dispid value. Desirably, dispid zero is reserved to provide a dispid with a special meaning.

At 355, the application passes the dispid retrieved at 350 to the dispinterface to invoke the method. The invocation of the method triggers another set of events in the dispatch proxy. First, the dispatch proxy looks up the function description for the method or property that is being invoked using the ITypeInfo pointer that it persists. Next, using the function description, it walks through the function parameters and applies conventional type checking and coercing, which are known in the art, to the parameters that are passed to match the data types of the method's parameters.

After the parameter type checking is completed, at 360 the dispatch proxy makes a call to the actual interface by mimicking a generic COM early bound method call.

Finally, at 365 the return value of the call is processed to see if the call was successful and it is passed up to the host, through the call chain. If the method call returns pointers of any sort, the dispatch proxy prepares a block of memory that can receive the pointer and passes this block's address with the call. If the pointer is to a COM object interface, then another dispatch proxy object is created for this pointer, and the new dispatch proxy address is returned to the host.

Method of Using an Object Proxy

The previous section described methods used by various embodiments of the invention to implement a dispatch proxy object. This section will describe an aspect of the invention known as an object proxy. Object proxy instances represent a structure, or a data type. If a method returns a pointer to another interface it receives the address of the location to write this pointer value as a parameter. The object proxies are in two different groups by nature, default object proxies and application specific object proxies.

In one embodiment of the invention, the default object proxies include InterfaceRef, BSTRRef, and IntRef. InterfaceRef represents an object that can be used as a reference for an interface pointer. BSTRREF and IntRef are types of object proxies that represent BSTR and integer variable types.

In an embodiment of the invention, the default object proxies implement two properties. The first is ByRef, which verifies that the object is a default object proxy component. This property is set to true on default object proxy objects, and false otherwise. The second property is the Value property, which contains the returned value.

Default object proxies are created by making calls to methods that have the same name as the default object proxy types. For instance, an InterfaceRef object proxy is returned from a call to the InterfaceRef( ) method.

Default object proxy objects are used in place of the by-reference parameters that serve as return values from method calls. A by-reference parameter indicates that a method is supposed to be called with a memory address being passed in place of the actual value for the parameter, and that the method should copy the information that it wants to return into the memory, starting from the address that it received in the parameter.

If a default object proxy value is passed to a method call that is made through a dispatch proxy object in place of a parameter that is supposed to be the address of an interface pointer, the dispatch proxy fills the Value property of the default object proxy with the interface pointer value that is returned by the actual method call upon its completion. The operation is the same for other object proxy types.

The second type of object proxies are application specific object proxies. These are object proxies implemented by the host application itself.

In alternative embodiments of the invention, both default object proxies and application specific object proxies represent structures and data types. The members of the structure are accessed as properties of an object proxy. Each element in an object proxy contains information about the type of the element, its size, and its offset in memory. The offset in memory is determined as if all the elements of the object proxy were aligned to create a C-like structure. Using these, script engines are provided with structure support. The proxy component can use this information and create blocks of memory just like an actual compiler would do. This is necessary when passing structures to interface methods.

Figure 4A:
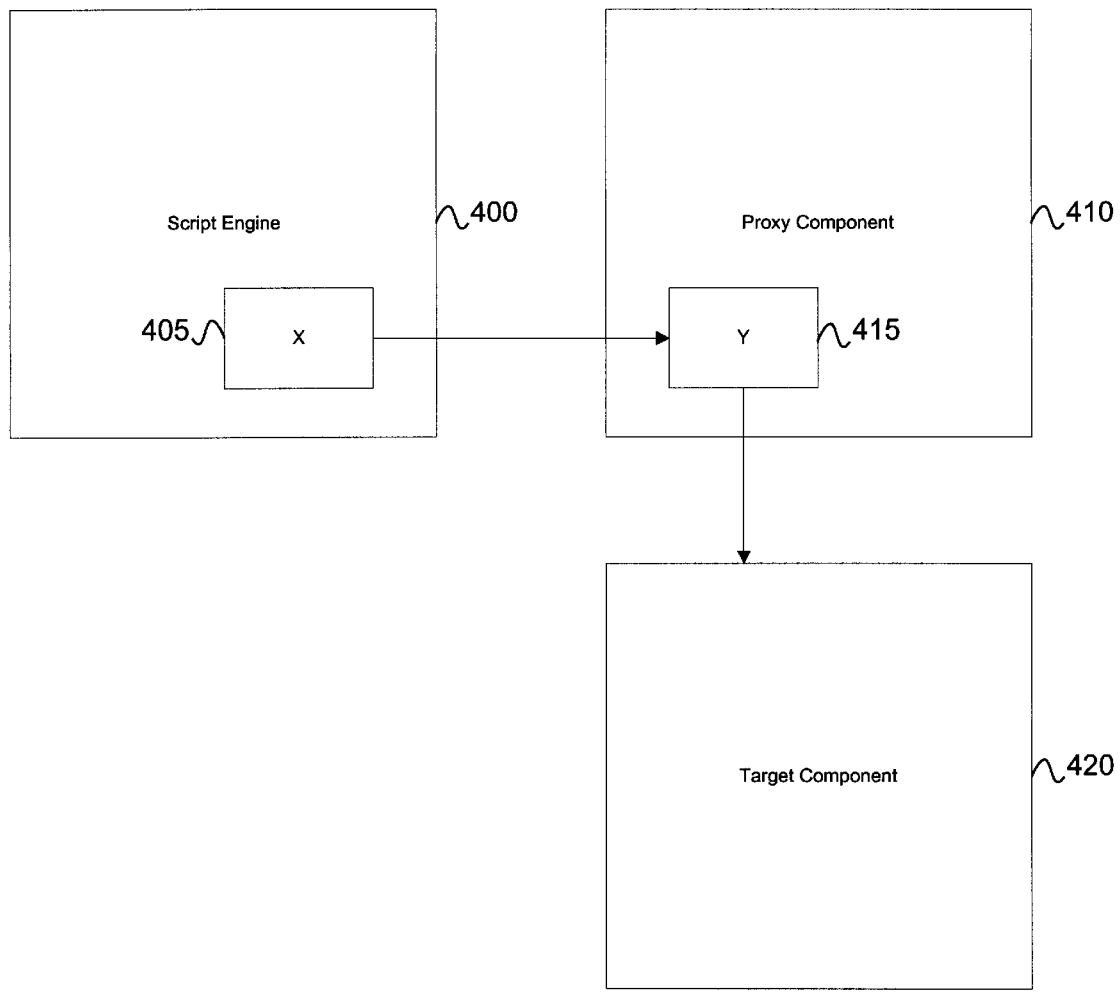
FIG. 4(a) is a system diagram and 4(b) an object diagram describing an object proxy in accordance with an embodiment of the invention.

Referring now to FIG. 4(a), a system level view of an embodiment of the invention describing object proxies is presented. The system, at a high level, comprises application 400, source element 405, proxy component 410, object proxy 415 and target component 420.

Application 400 is an application desiring to use an object proxy. In one embodiment of the invention, application 400 is a script engine such as the JavaScript engine. Source object 405 is an element having a data type supported by the programming language implemented by the script engine, or an element supported by the programming language in which application 400 is written.

Target component 420 is a software component providing interface method 425. In one embodiment of the invention, target component 420 is defined using the COM model.

Proxy component 410 is a software component implementing an embodiment of the invention by supplying either or both dispatch proxies and object proxies. Object proxy 415 is used to "represent" source element 405 in method calls to interfaces exposed by target component 420. Object proxy 415 is used because source element 405 is not a type required by the interface methods 425 of target component 420. A typical example is when the target component requires a pointer to a structure, and the source program does not support either or both pointers and structures.

Figure 4B:
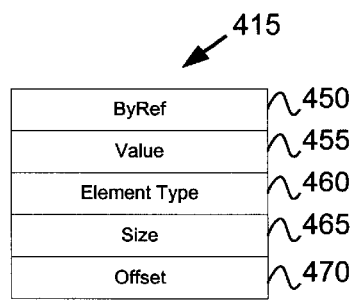

Referring now to FIG. 4(b), a representation of the data structure of object proxy 415 is presented. ByRef element 450 is an element that indicates the object is an object proxy, and is used to distinguish the object proxy from other objects in the system.

Value 455 contains the value of the object proxy element. For example, this value may be a pointer when interface method 425 requires a pointer parameter and source element 405 is not capable of supplying a pointer value. Type 460 is an element describing the data type of the object proxy element. Size 465 is an element containing the size of the value attribute. Size 465 is desirably expressed in bytes. Offset 460 is an element containing the memory offset of value 455. The object proxy can represent more than one attribute, in which case the above elements are repeated for each represented attribute.

Conclusion

The creation and use of dispatch proxies and object proxies has been described. In particular, systems and methods of creating a dispatch proxy having late bound interface methods to represent a target component having early bound and late bound references have been described. Although specific embodiments have been illustrated and described herein, it will be appreciated by those of ordinary skill in the art that any arrangement which is calculated to achieve the same purpose may be substituted for the specific embodiments shown. For example, the systems and methods described herein could be applied to component model interfaces other than COM. This application is intended to cover any adaptations or variations of the present invention. Therefore, it is manifestly intended that this invention be limited only by the following claims and equivalents thereof.

We claim:

1. A computer system for transparently interfacing a client component with a target component, the system comprising:
    (a) a client component operable to communicate with target components;
    (b) a target component having an interface; and
    (c) an interfacing component operable to:
        (i) obtain the identity of the target component from the client component;
        (ii) analyze the target component to determine whether the client component is operable to directly communicate through the target component's late bound interface, wherein the direct communication is between a client object and a target object;
        (iii) return the target component's interface to the client component if the client component can directly communicate with the target component's interface; and
        (iv) return the interface of a proxy component to the client component if the client component cannot directly communicate with the target component's interface, the proxy component's interface capable of directly communicating with the client component causing the proxy component to pose as the target component to the client component.

2. The system of claim 1, wherein the proxy component analyzes methods in the target component's interface and creates corresponding methods in the proxy component's interface, such that when the interface of the proxy component receives a call from the client component, the proxy component makes a corresponding call in the target component's interface.

3. The system of claim 2, wherein the proxy component further translates parameters from a format received with calls to methods in the proxy component's interface to a format appropriate for calls to the target component's interface, and passes the translated parameters with the corresponding method calls in the target component's interface.

4. The system of claim 3, wherein the proxy component further translates return values from calls to the target component's interface to a format suitable for return values from the corresponding method calls on the proxy component's interface, and returns the translated return values to the client component when returning from method calls on the proxy component's interface.

5. The system of claim 4, wherein the proxy component creates proxy objects for objects returned from calls to the target component's interface, and returns the proxy objects to the client component when returning from corresponding calls on the proxy component's interface.

6. The system of claim 1 further comprising a force proxy property, wherein if the force proxy property is set to a first value, the interfacing component returns a proxy component's interface to the client component, irrespective of whether the client component can directly communicate with the target component's interface.

7. The system of claim 1, wherein the target component is a COM (Component Object Module) compatible component.

8. The system of claim 1, wherein the proxy component is a COM (Component Object Module) compatible component.

9. The system of claim 1, wherein the client component is a scripting component operable to obtain a script file comprising a plurality of instructions to be performed on the target component, and wherein the scripting component is operable to translate the plurality of instructions in the script file into method calls for the target component.

10. The system of claim 1, wherein the target component implements an early bound interface, or a late bound interface, or both.

11. The system of claim 10, wherein the proxy component implements a late bound interface in which the proxy component creates methods corresponding to methods in the target component's interface.

12. A method for transparently providing an interface for a target component to a host application, comprising:
obtaining the identity of a target component having an interface;
determining whether the host application can directly communicate with through the target component's late bound interface, wherein the direct communication is between a client object and a target object; and
if the host application can directly communicate with the target component's interface, returning the target component's interface to the host application; otherwise generating a proxy component that poses as a target component, said proxy component having an interface with which the host application can directly communicate, and returning the proxy component's interface to the host application.

13. The method of claim 12, further comprising the proxy component analyzing the methods in the target component's interface and creating corresponding methods in the proxy component's interface, such that when a call is received in the proxy component's interface, the proxy component transparently makes a corresponding call in the target component's interface.

14. The method of claim 13, further comprising the proxy component translating parameters received in a call to the proxy component's interface to a format suitable for a corresponding call to the target component's interface, and passing the parameters with the corresponding call to the target component's interface.

15. The method of claim 14, further comprising the proxy component translating a return value of the call to the target component's interface to a format suitable as a return value of a corresponding call to the proxy component's interface, and returning the translated return value to the host application.

16. The method of claim 15, further comprising the proxy component creating proxy objects for objects returned from calls to the target component's interface, and returning the proxy objects to the host application as objects returned from a corresponding call to the proxy component's interface.

17. The method of claim 12, further comprising testing a force proxy property for a first value, and if the force proxy property is the first value, generating a proxy component which poses as a target component, said proxy component having an interface with which the host application can directly communicate, and returning the proxy component's interface to the host application irrespective of whether the host application can directly communicate with the target component's interface.

18. The method of claim 12, wherein the proxy component is a COM (Component Object Module) compatible component.

19. The method of claim 12, wherein the target component is a COM (Component Object Module) compatible component.

20. The method of claim 12, wherein the host application is a scripting application for obtaining a script file comprising a plurality of instructions to be performed on the target component, and the method further comprising processing the plurality of instructions in the script file into method calls for the target component.

21. The method of claim 12, wherein the target component implements an early bound interface, a late bound interface, or both.

22. The method of claim 21, wherein the proxy component implements a late bound interface.

23. A computer-readable medium having computer readable instructions capable of performing the method recited in claim 12.

* * * * *